United States Patent [19]
Ishizaki et al.

[11] Patent Number: 5,447,746
[45] Date of Patent: Sep. 5, 1995

[54] ZONE TEXTURING METHOD FOR A MAGNETIC RECORDING DISK

[75] Inventors: Rohit Ishizaki, Sunnyvale; Akinori Kurikawa, Cupertino; Rohit Narendra, Santa Clara, all of Calif.

[73] Assignee: Hoya Corporation USA, San Jose, Calif.

[21] Appl. No.: 341,730

[22] Filed: Nov. 18, 1994

[51] Int. Cl.⁶ .............................................. B05D 5/12
[52] U.S. Cl. .................... 427/127; 427/256; 427/443.2
[58] Field of Search ............ 427/127, 256, 443.2, 427/265, 261, 128–132; 428/694, 695, 900

*Primary Examiner*—Bernard Pianalto
*Attorney, Agent, or Firm*—Majestic, Parsons, Siebert & Hsue

[57] ABSTRACT

A magnetic recording disk is zone-textured by using two or more tubular needles with outlets opening to its surface. While the disk is rotated around its center axis, different coating materials such as solutions containing and not containing colloidal silica are passed through these needles and deposited through their outlets inside different zones on the disk surface. The needles are moved such that the radial distances of their outlets from the disk center vary within certain ranges corresponding to different zones such as the data and landing zones on the disk surface.

5 Claims, 1 Drawing Sheet

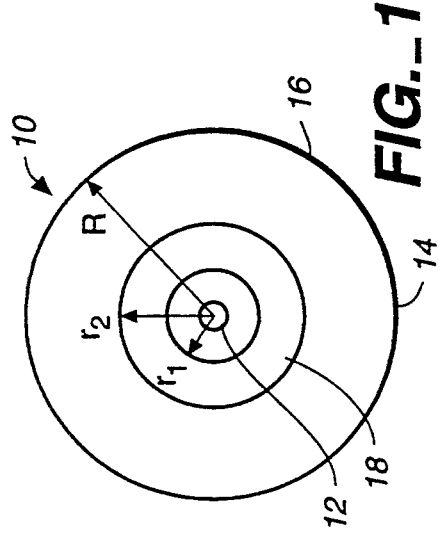
FIG._1
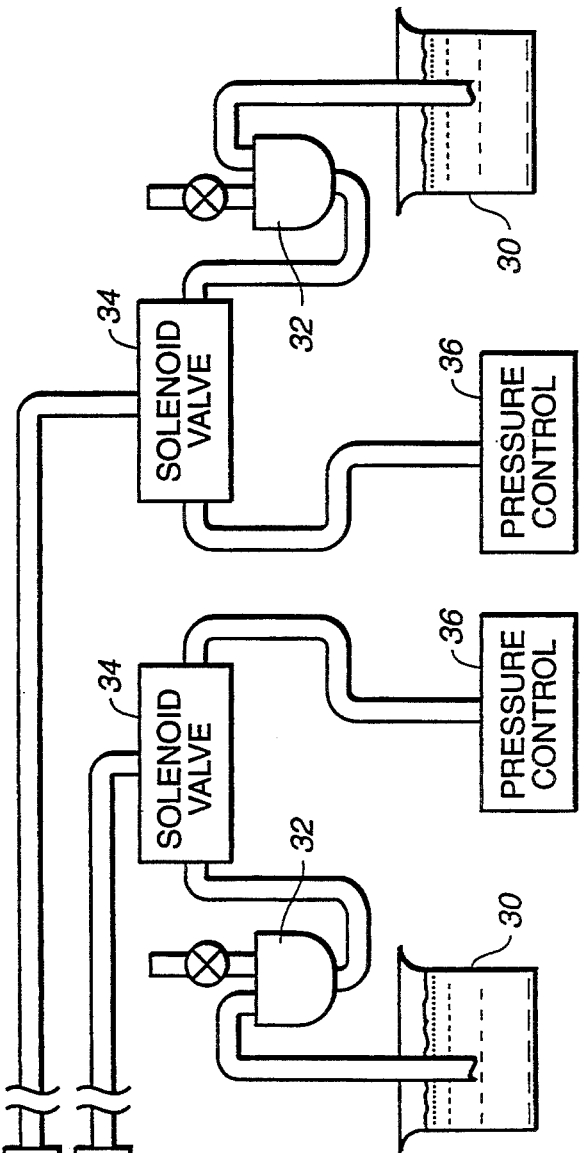
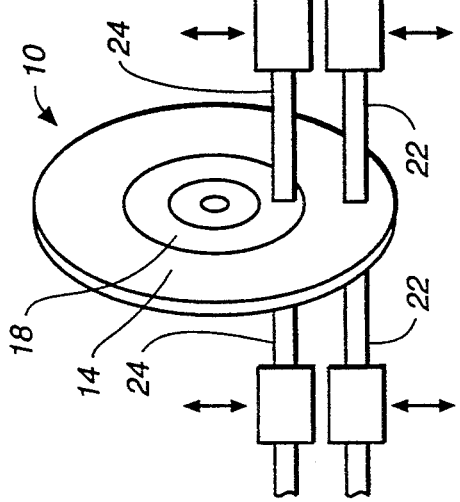
FIG._2

ZONE TEXTURING METHOD FOR A MAGNETIC RECORDING DISK

BACKGROUND OF THE INVENTION

This invention relates to a method of carrying out zone texturing on a magnetic recording disk.

Magnetic recording disks are a kind of magnetic recording media for recording data magnetically thereon and generally have their circular surface divided into a data zone and a landing zone. The data zone is an area where a magnetic head may be used to record data or to read recorded data. The landing zone is an area used for resting the magnetic head when it is not being used for recording or reading data. A hole is generally provided at the center such that a rotary shaft can be engagingly inserted therethrough to cause the disk to rotate. The data zone has an annular area and may be formed along the periphery of the disk, the landing zone being formed concentrically inside and adjacent the data zone.

The surface of the disk is intentionally made rough for various reasons, this process being called the texturing. The landing zone is textured primarily for making it easier for the magnetic head to move away from the disk surface when the disk begins to rotate, because if the surface is too smooth, the magnetic head will tend to be adsorbed thereby and the disk may not be able to turn easily or may not be able to start turning at all. The data zone may be textured for aerodynamically stabilizing the gap between the head and the disk surface.

Prior art methods of zone texturing included mechanical controls and sputtering, but surface roughness required for practical purposes could not be obtained through mechanical control and it was difficult to control the surface roughness within a limited area through sputtering.

SUMMARY OF THE INVENTION

It is therefore an object of the present invention to provide a zone texturing method for a magnetic recording disk capable of controlling the surface roughness within a plurality of limited zones.

A zone texturing method according to this invention, with which the above and other objects can be accomplished, may be characterized as providing two or more tubular needles through which different coating materials are passed through to be deposited on the disk at different radial distances from its center. While the disk is rotated around its center axis, different coating materials are released from the outlets of the needles, and the needles are moved radially with respect to the disk such that the radial distances of their outlets from the center of the disk change within specified ranges corresponding to different zones on the disk surface.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a plan view of a magnetic recording disk zone-textured by a method embodying the invention; and FIG. 2 is a schematic of means for zone-texturing a magnetic recording disk as shown in FIG. 1 by a method embodying this invention.

DETAILED DESCRIPTION OF THE INVENTION

As shown in FIG. 1, a magnetic recording disk 10 which has been zone-textured by a method embodying this invention may be characterized as having a hole 12 at the center, a data zone 14 having an annular area formed along the outer periphery 16 of the disk 10 which is substantially a circle of radium R, and a landing zone 18 also having an annular area which is adjacent and inside the data zone 14, circles of radii $r_1$ and $r_2$, concentric with the periphery 16 of the disk 10, being respectively the inner boundary of the landing zone 18 and the boundary between the data zone 14 and the landing zone 18, that is, the outer boundary of the landing zone 18 and the inner boundary of the data zone 14. The sectional view of disk 10 showing its layer structure may be, for example, as shown in U.S. Pat. No. 5,316,844 issued to Suzuki et al. on May 31, 1994, which will be herein incorporated by reference. As discussed above, the surface roughness of the landing zone 18 should be sufficient to make it easier for a magnetic head to move away from it when the disk 10 begins to rotate, and the surface roughness of the data zone 14 must be controlled so as to allow high-density recording thereon.

As shown schematically in FIG. 2, the disk 10 to be zone-textured is held (by a mechanism of a known type not shown in FIG. 2) with its surfaces vertically oriented and rotated around its horizontally oriented center axis through the center hole 12 as indicated by an arcuate arrow. For the purpose of depositing coating materials of two different kinds separately and individually on the data zone 14 and the landing zone 18 of the disk 10, two tubular needles 22 and 24 of inner diameter about 0.60–0.75 mm and outer diameter about 1.2–2.1 mm are provided with outlet openings positioned adjustably at an appropriate height above the upper surface of the disk 10. According to a preferred embodiment of the invention, both surfaces of the disk 10 are processed simultaneously although, for the convenience of illustration, means for zone texturing by the method of this invention is shown only for one side in FIG. 2. The coating material to be deposited on the landing zone 18 may be a solution containing colloidal silica, or hard spheres of a kind disclosed in aforementioned U.S. Pat. No. 5,316,844. The coating material to be deposited on the data zone 14 may be a different solution not containing any such colloidal silica, or containing colloidal silica at a lower concentration. These coating materials are stored inside source tanks 30, each of which is connected to one of the needles 22 and 24 through a filter 32 for controlling the size of particles contained in the source material and a solenoid valve 34 connected to a pressure controller 36 for controlling the dispense timing of the source material.

Each of the needles 22 and 24 is adapted to move horizontally in a radial direction with respect to the disk 10, as shown by double-headed arrows in FIG. 2. This may be accomplished by providing a horizontal rail or rails (not shown) along which the needles 22 and 24, or holders therefor, are adapted to slide. According to the method of this invention, the needle 22 corresponding to the data zone 14 is moved such that its outlet opening moves within a range of $r_2$ and R from the axis of rotation of the disk 10, and the other needle 24 corresponding to the landing zone 18 is moved such that its outlet opening moves within a different range of $r_1$ and $r_2$.

Stoppers may be provided for restricting the motion of the needles 22 and 24 such that their outlet openings can move only within these limited ranges.

In practice, the coating materials are dispensed through the needles 22 and 24 while the disk 10 on the turntable 20 is uniformly rotated. Degrees of surface roughness thus produced on the data and landing zones 14 and 18 are microscopically examined and the film thickness on the disk 10 is measured, say, by an elipsometer for adjusting the flow rates of the coating materials and other operating conditions. After these operating conditions are adjusted, the coating operation is continued with the outlet openings of the needles 22 and 24 moved radially such that the data and landing zones 14 and 18 are each coated entirely with the corresponding coating material.

The invention has been described above with reference to only one example, but the scope of the invention is not intended to be limited by this example. Many modifications and variations are possible within the scope of the invention. For example, the plural number of the needles is not limited to two because it is not every magnetic recording disk that has one landing zone and one data zone. The coating materials may be a solution containing a different kind of ceramic particles such as zirconia. As a practical example, the ranges of radial distance, in which the needles 22 and 24 are allowed to move, may be 16.0–31.5 mm and 12.0–16.0 mm, respectively, but neither is this example intended to limit the scope of the invention. In summary, the invention teaches the use of two or more needles to control the surface roughness of the landing and data zones separately. Magnetic recording disks with surface roughness thus controlled have been subjected to contact-start-stop (CSS) tests of the kind described in aforementioned U.S. Pat. No. 5,316,844, and it was discovered that the flying height of the recording head could be reduced from a prior art value of about 3.0 microinches to less than 1.3 microinches over the landing zone without affecting the CSS characteristics adversely. Reduction in the flying height makes it possible to produce recording media with improved recording densities.

What is claimed is:

1. A zone texturing method for a magnetic recording disk having a surface divided into annular zones, said method comprising the steps of:
   providing two or more tubular needles with outlets opening to said surface of said disk;
   rotating said disk around its center axis;
   causing different coating materials to pass through said outlets of said needles and be deposited in different ones of said zones on said surface; and
   moving each of said outlets radially with respect to said disk within different one of ranges of radial distance from said center axis.

2. The method of claim 1 wherein said ranges individually correspond to said zones.

3. The method of claim 1 further comprising the steps of:
   examining surface roughness and film thickness on said disk after said coating materials are deposited within limited areas on said disk; and
   adjusting, according to said examined surface roughness, operating conditions for said steps of rotating said disk and causing said coating materials to pass through said outlets.

4. The method of claim 1 wherein said different coating materials include a first solution containing colloidal silica and a second solution not containing colloidal silica.

5. The method of claim 1 wherein said different coating materials include a first solution containing colloidal silica at a higher concentration and a second solution containing colloidal silica at a lower concentration.

* * * * *

UNITED STATES PATENT AND TRADEMARK OFFICE
CERTIFICATE OF CORRECTION

PATENT NO. : 5,447,746
DATED : September 5, 1995
INVENTOR(S) : Ishizaki et al.

It is certified that error appears in the above-indentified patent and that said Letters Patent is hereby corrected as shown below:

On the Title Page [75] replace:
"[75]     Inventors:     Rohit Ishizaki, Sunnyvale; Akinori Kurikawa, Cupertino; Rohit Narendra, Santa Clara, all of Calif."

with
--[75]     Inventors:     Koki Ishizaki, Sunnyvale; Akinori Kurikawa, Cupertino; Rohit Narendra, Santa Clara, all of Calif.--

Signed and Sealed this

Ninth Day of January, 1996

Attest:

BRUCE LEHMAN

*Attesting Officer*     *Commissioner of Patents and Trademarks*